United States Patent
Li et al.

(10) Patent No.: US 10,937,448 B2
(45) Date of Patent: Mar. 2, 2021

(54) VOICE ACTIVITY DETECTION METHOD AND APPARATUS

(71) Applicant: BAIDU ONLINE NETWORK TECHNOLOGY (BEIJING) CO., LTD., Beijing (CN)

(72) Inventors: Chao Li, Beijing (CN); Weixin Zhu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 110 days.

(21) Appl. No.: 16/234,423

(22) Filed: Dec. 27, 2018

(65) Prior Publication Data

US 2019/0385636 A1 Dec. 19, 2019

(30) Foreign Application Priority Data

Jun. 13, 2018 (CN) .......................... 201810606354.9

(51) Int. Cl.
| | |
|---|---|
| *G10L 25/78* | (2013.01) |
| *G10L 25/84* | (2013.01) |
| *G10L 15/02* | (2006.01) |
| *G10L 15/06* | (2013.01) |
| *G10L 15/16* | (2006.01) |

(Continued)

(52) U.S. Cl.
CPC .............. *G10L 25/84* (2013.01); *G10L 15/02* (2013.01); *G10L 15/063* (2013.01); *G10L 15/16* (2013.01); *G10L 15/22* (2013.01); *G10L 25/78* (2013.01); *G10L 25/87* (2013.01)

(58) Field of Classification Search
CPC ................................ G10L 25/78; G10L 25/87
See application file for complete search history.

(56) References Cited

U.S. PATENT DOCUMENTS

| | | | |
|---|---|---|---|
| 2014/0067388 A1* | 3/2014 | Manikandan | ........... G10L 15/20 704/233 |
| 2017/0004840 A1 | 1/2017 | Jiang et al. | |
| 2017/0092297 A1* | 3/2017 | Sainath | ................... G10L 25/78 |

FOREIGN PATENT DOCUMENTS

| | | | |
|---|---|---|---|
| CN | H08-032526 A | | 2/1996 |
| CN | 1628337 A | | 6/2005 |
| CN | 101599269 A | | 12/2009 |

(Continued)

OTHER PUBLICATIONS

The Chinese First Examination Report of corresponding Chinese application No. 201810606354.9, dated May 13, 2019.

*Primary Examiner* — Feng-Tzer Tzeng
(74) *Attorney, Agent, or Firm* — J.C. Patents (57) ABSTRACT

A voice activity detection method and an apparatus are provided by embodiments of the present application. The method includes: performing framing processing on a voice to be detected to obtain a plurality of audio frames to be detected; obtaining an acoustic feature of each of the audio frames to be detected, and sequentially inputting the acoustic feature of the each of the audio frames to be detected to a VAD model, wherein the VAD model is configured to classify a first N voice frame in the voice to be detected as a noise frame, classify frames from an (N+1)-th voice frame to a last voice frame as voice frames, and classify a M noise frame after the last voice frame as a voice frame, where N and M are integers; and determining, according to a classification result output by the VAD model.

17 Claims, 8 Drawing Sheets

(51) Int. Cl.
*G10L 15/22* (2006.01)
*G10L 25/87* (2013.01)

(56) References Cited

FOREIGN PATENT DOCUMENTS

| | | | |
|---|---|---|---|
| CN | 103886871 A | 6/2014 | |
| CN | 104409080 A | 3/2015 | |
| WO | WO 2001086633 * | 5/2001 | ............ G10L 25/87 |
| WO | 01/86633 A1 | 11/2001 | |
| WO | WO 2001086633 A1 * | 11/2001 | |

* cited by examiner

VOICE ACTIVITY DETECTION METHOD AND APPARATUS

CROSS-REFERENCE TO RELATED APPLICATIONS

The present application claims priority to Chinese application number 201810606354.9, filed on Jun. 13, 2018, which is incorporated by reference in its entirety.

TECHNICAL FIELD

The present application relates to the field of voice recognition technologies, and in particular to a voice activity detection method and an apparatus.

BACKGROUND

With the development of human-computer interaction technology, the voice recognition technology has shown its importance. In voice recognition systems, voice activity detection technology, also known as voice activity detection (VAD), is a very important technology. Voice activity detection refers to identifying the start point and end point of a voice segment in a continuous voice signal.

In the prior art, the start point and the end point of a voice segment in a piece of audio can be determined by a VAD model, where the VAD model is a classification model. In the specific implementation, the audio is framed, the acoustic feature of each audio frame is extracted and sequentially input into the VAD model. The VAD model classifies each frame, according to the acoustic feature, as a voice frame or a noise frame. Finally, the first voice frame in a continuous train of voice frames is set to be the start point of the voice segment, and the last voice frame is set to be the end point of the voice segment.

However, the existing activity detection technology has a problem of poor accuracy, suffering low accuracy in the detection.

SUMMARY

Embodiments of the present application provide a voice activity detection method and apparatus for improving the accuracy in voice activity detection.

In a first aspect, an embodiment of the present application provides a voice activity detection method, including:

performing framing processing on a voice to be detected to obtain a plurality of audio frames to be detected;

obtaining an acoustic feature of each of the audio frames to be detected, and sequentially inputting the acoustic feature of the each of the audio frames to be detected to a Voice Activity Detection (VAD) model, where the VAD model is configured to classify a first N voice frame in the voice to be detected as a noise frame, classify frames from an (N+1)-th voice frame to a last voice frame as voice frames, and classify a M noise frame after the last voice frame as a voice frame, where N and M are integers; and determining, according to a classification result output by the VAD model, a start point and an end point of a voice segment, where the start point corresponds to a first audio frame classified as a voice frame, and the end point corresponds to a last audio frame classified as a voice frame.

In a possible design, the determining, according to a classification result output by the VAD model, a start point and an end point of the voice segment includes:

determining, according to a first one of the audio frames corresponding to a first classification value that is greater than a first threshold and is output by the VAD model, a first voice frame, and determine, according to the first voice frame, the start point of the voice segment; and determining, according to a first one of the audio frames corresponding to a second classification value that is smaller than a second threshold and is output by the VAD model, a last voice frame after the first voice frame has been determined, and determining, according to the last voice frame, the end point of the voice segment, where the first threshold is greater than the second threshold.

In a possible design, after the determining, according to a first one of the audio frames corresponding to a first classification value that is greater than a first threshold and is output by the VAD model, a first voice frame, the method further includes:

obtaining a P audio frame before the first voice frame from a cache, where P is a positive integer greater than the N; and sending P audio frame and the audio frame that has been determined to be a voice frame to a voice recognizer.

In a possible design, before the sequentially inputting the acoustic feature of the each of the audio frames to be detected to a VAD model, the method further includes:

performing framing processing on a voice to be trained to obtain a plurality of audio frames to be trained;

obtaining an acoustic feature of each of the audio frames to be trained and a label corresponding to the acoustic feature of the each of the audio frames to be trained, the label being configured to indicate a classification result of the audio frames to be trained, where a first N voice frame in the voice to be trained is classified as a noise frame, frames from an (N+1)-th voice frame to a last voice frame are classified as voice frames and a M noise frame after the last voice frame is classified as a voice frame; and training, according to the acoustic feature of the audio frames to be trained and the label corresponding to the acoustic feature of the each of the audio frames to be trained, the VAD model to be trained to obtain a trained VAD model.

In a possible design, the obtaining the label corresponding to the acoustic feature of the each of the audio frames to be trained includes:

sequentially performing an annotation process on the acoustic feature of the each of the audio frames to be trained to obtain candidate labels corresponding to the acoustic feature of the each of the audio frames to be trained;

modifying a first N candidate label, which indicates a voice frame, to obtain a first label, the first label being configured to indicate that the first N voice frame is classified as a noise frame;

modifying a M candidate label which indicates a noise frame, after the last voice frame to obtain a second label, the second label being configured to indicate that M noise frame is classified as a voice frame; and obtaining, according to remainder of the candidate labels, the first label and the second label, a label corresponding to the acoustic feature of the each of the audio frames to be trained.

In a possible design, the VAD model is a deep neural network model.

In a possible design, N is greater than or equal to the M.

In a second aspect, an embodiment of the present application provides a voice activity detection apparatus, including:

a framing module, configured to perform framing processing on a voice to be detected to obtain a plurality of audio frames to be detected;

a detecting module, configured to obtain an acoustic feature of each of the audio frames to be detected, and sequentially input the acoustic feature of the each of the audio frames to be detected to a Voice Activity Detection (VAD) model, where the VAD model is configured to classify a first N voice frame in the voice to be detected as a noise frame, classify frames from an (N+1)-th voice frame to a last voice frame as voice frames, and classify a M noise frame after the last voice frame as a voice frame, where N and M are integers; and a determining module, configured to determine, according to a classification result output by the VAD model, a start point and an end point of a voice segment, where the start point corresponds to a first audio frame classified as a voice frame, and the end point corresponds to a last audio frame classified as a voice frame.

In a possible design, the determining module is configured to:

determine, according to a first one of the audio frames corresponding to a first classification value that is greater than a first threshold and is output by the VAD model, a first voice frame, and determine, according to the first voice frame, the start point of the voice segment; and determine, according to a first one of the audio frames corresponding to a second classification value that is smaller than a second threshold and is output by the VAD model, a last voice frame after the first voice frame has been determined, and determine, according to the last voice frame, the end point of the voice segment, where the first threshold is greater than the second threshold.

In a possible design, the apparatus further includes: a communication module, configured to, after the determining, according to a first one of the audio frames corresponding to a first classification value that is greater than a first threshold and is output by the VAD model, a first voice frame, obtain a P audio frame before the first voice frame from a cache, where P is a positive integer greater than the N; and send P audio frame and the audio frame that has been determined to be a voice frame to a voice recognizer.

In a possible design, the apparatus further includes: a training module, configured to, before the sequentially inputting the acoustic feature of the each of the audio frames to be detected to a VAD model, perform framing processing on a voice to be trained to obtain a plurality of audio frames to be trained;

obtain an acoustic feature of each of the audio frames to be trained and a label corresponding to the acoustic feature of the each of the audio frames to be trained, the label being configured to indicate a classification result of the audio frames to be trained, where a first N voice frame in the voice to be trained is classified as a noise frame, frames from an (N+1)-th voice frame to a last voice frame are classified as voice frames and a M noise frame after the last voice frame is classified as a voice frame; and train, according to the acoustic feature of the audio frames to be trained and the label corresponding to the acoustic feature of the each of the audio frames to be trained, the VAD model to be trained to obtain a trained VAD model.

In a possible design, the training module is configured to:

sequentially perform an annotation process on the acoustic feature of the each of the audio frames to be trained to obtain candidate labels corresponding to the acoustic feature of the each of the audio frames to be trained;

modify a first N candidate label which indicates voice frame, to obtain a modified first label, the first label being configured to indicate that the first N voice frame is classified as a noise frame;

modify a M candidate label which indicates a noise frame, after the last voice frame to obtain a second label, the second label being configured to indicate that M noise frame is classified as a voice frame; and obtain, according to remainder of the candidate labels, the first label and the second label, a label corresponding to the acoustic feature of the each of the audio frames to be trained.

In a possible design, the VAD model is a deep neural network model.

In a possible design, N is greater than or equal to the M.

In a third aspect, an embodiment of the present application provides a voice activity detection apparatus, including: at least one processor and a memory;

the memory storing a computer execution instruction;

the at least one processor executing the computer-executed instruction stored in the memory, causing the at least one processor to perform the voice activity detection method as described in the above first aspect and the various possible designs thereof.

In a fourth aspect, an embodiment of the present application provides a computer readable storage medium storing a computer execution instruction which, when executed by a processor, implements the voice activity detection method as described in the above first aspect and the various possible designs thereof.

In the voice activity detection method and apparatus provided by the embodiments of the present application, the method performs framing processing on a voice to be detected to obtain a plurality of audio frames to be detected; obtains an acoustic feature of each of the audio frames to be detected, and sequentially inputs the acoustic feature of the each of the audio frames to be detected to a VAD model; determines, according to the classification result output by the VAD model, the start point and the end point of the voice segment. By using the VAD model, the first N voice frame in the voice to be detected is classified as a noise frame, preventing noise frames from being erroneously delivered to the voice recognizer. Moreover, by using the VAD model, frames from the (N+1)-th voice frame to the last voice frame are classified as voice frames, and M noise frame after the last voice frame is classified as a voice frame, avoiding the problem where low voice is mis-recognized as an end point, and the problem where a pause by the user breaks a full sentence into two, thereby improving the accuracy in the voice activity detection.

BRIEF DESCRIPTION OF THE DRAWINGS

In order to more clearly illustrate the embodiments of the present application or the technical solutions in the prior art, a brief description of the drawings used in describing the embodiments or the prior art will be given below. Obviously, the drawings in the following description are merely some embodiments of the present application, and other drawings may be obtained by those skilled in the art without paying any creative labor.

DETAILED DESCRIPTION

In order to make the objectives, technical solutions and advantages of embodiments of the present application clearer, now the technical solutions in the embodiments of the present application will be clearly and comprehensively described with reference to the drawings accompanying the embodiments of the present application. Obviously, the described embodiments are merely part of the embodiments of the application, rather than all of them. Any and all other embodiments obtained by those of ordinary skill in the art based on the embodiments herein without any creative work shall fall into the scope of the present application.

Figure 1:
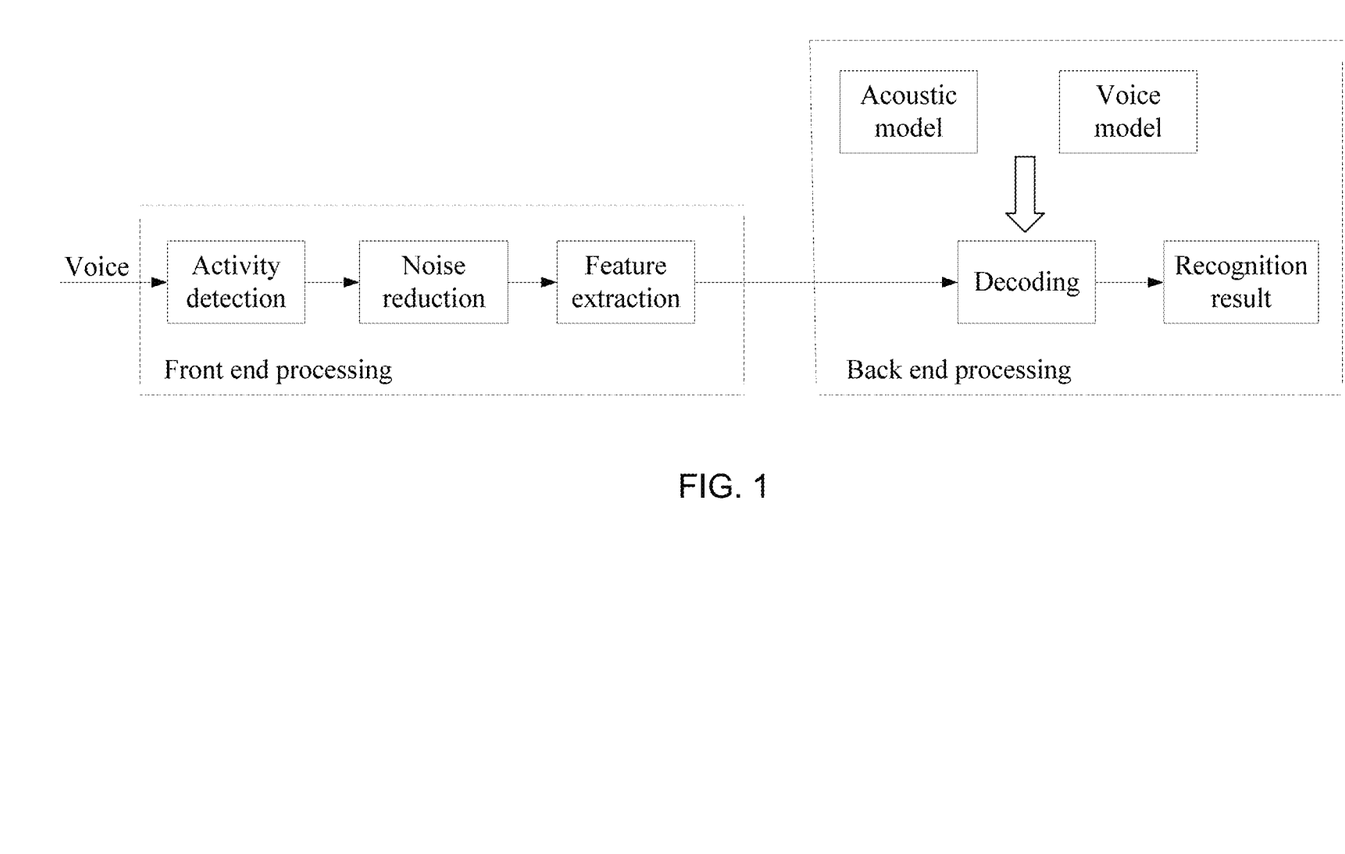
FIG. 1 is a schematic diagram of a voice recognition principle of a voice recognition system provided by an embodiment of the present application.

FIG. 1 is a schematic diagram of a voice recognition principle of a voice recognition system provided by an embodiment of the present application. The problem to be solved by Automatic Voice Recognition (ASR) is to enable computers to "understand" human voice and turn voice into text. As shown in FIG. 1, the recognition process of the voice recognition system includes a front end process and a back end process. The front end may be any type of intelligent terminals, such as a smart phone, a smart speaker, a smart TV, a smart refrigerator, etc., that are enabled to perform voice interaction with the user. The specific implementation of the intelligent terminal is not particularly limited in the present embodiment. The back end may be a server capable of performing data logical processing, and those skilled in the art can understand that the back end may also be a processor of the intelligent terminal. A pre-trained acoustic model and a voice model can be stored in the back end. The acoustic model corresponds to the calculation from a voice to a probability of a syllable, and the voice model corresponds to the calculation from a syllable to a probability of a word.

In a specific implementation process, the front end performs framing processing on a received voice after receiving the voice, and then performs activity detection. After detecting a start point of a voice segment, voice frames after the start point are subjected to noise reduction processing, and then feature extraction is performed until the end point of the voice segment is detected. The recognition result is obtained by decoding the extracted acoustic feature, the acoustic model, and the voice model. In one possible implementation, the decoding is about compiling an acoustic model, a dictionary, and a language model into a network. Decoding happens in this dynamic network space by selecting one or more optimal paths as the recognition result (i.e., the optimal output character sequence) based on the maximum a posteriori probability.

It can be seen that activity detection is particularly important in this process because it determines the input to the voice recognition system. However, in prior art activity detection, since the noise segment before the voice segment is classified as voice, there can be a case where the detection of the start point is of poor accuracy. Moreover, when the user speaks at a descending voice, or pauses briefly, there can be a case where the detection of end point is inaccurate, and thus the accuracy of activity detection is not high enough. Based on this, an embodiment of the present application provides a voice activity detection method to improve the accuracy in voice activity detection.

In the present embodiment, the voice activity detection is performed by a Voice Activity Detection (VAD) model. The present embodiment performs different algorithm constraints on the start point and the end point in the VAD model to improve the accuracy of the voice activity detection. In the present embodiment, a possible implementation of the algorithm constraint is given, and delayed control is applied to the start point and the end point of the voice to obtain sufficient confidence, thereby improving the accuracy in the voice activity detection. The following is a detailed description about training and using the model.

Figure 2:
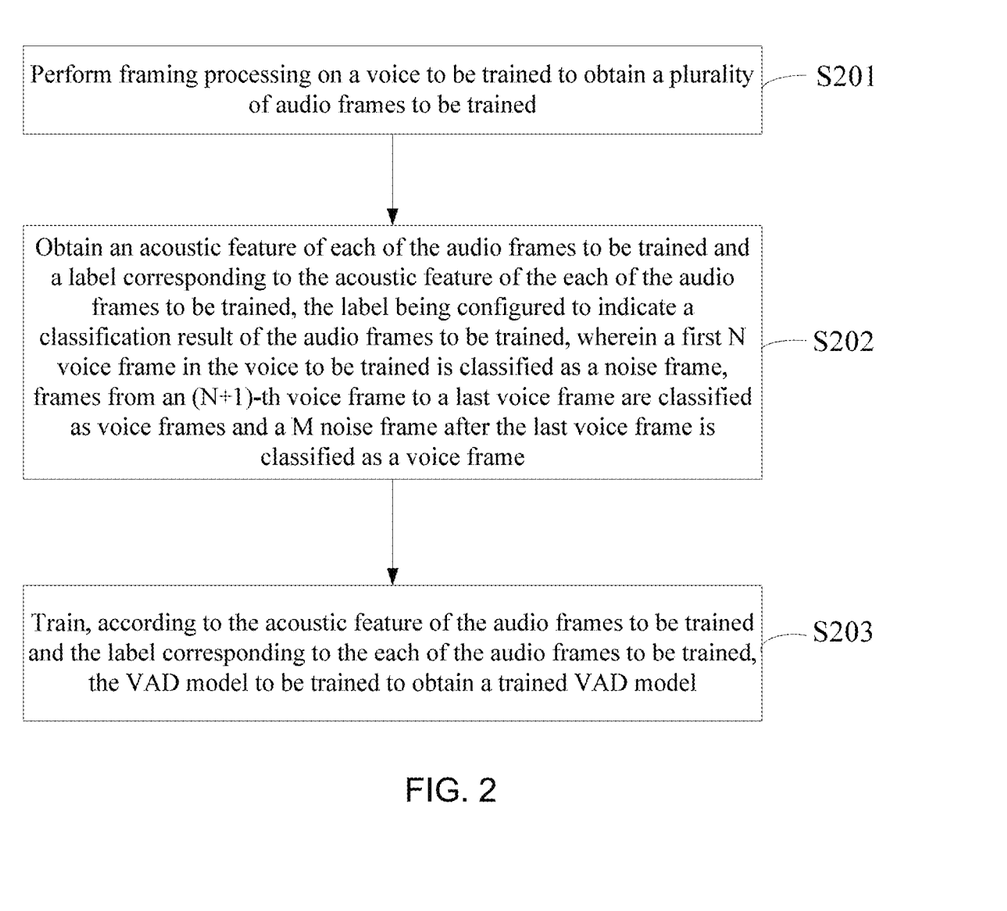
FIG. 2 is a flowchart of obtaining a VAD model provided by an embodiment of the present application.

FIG. 2 is a flowchart of obtaining a VAD model provided by an embodiment of the present application. As shown in FIG. 2, the method includes:

S201: perform framing processing on a voice to be trained to obtain a plurality of audio frames to be trained.

In a specific implementation process, a plurality of voice pieces of the user may be collected as the voices to be trained. For example, 10,000 voice pieces may be collected, each piece lasting for about several seconds. For each voice to be trained, a framing processing is performed to obtain a plurality of audio frames to be trained.

Specifically, the framing processing may be performed according to a preset frame length and a preset frame shift. For example, the frame length may be 25 milliseconds (ms), and the frame shift may be 10 ms. Thus, there may be a partial overlap in timing between individual frames. It can understand by those skilled in the art that the frame length and frame shift herein are merely exemplary, and the embodiment is not particularly limited thereto.

S202: obtain an acoustic feature of each of the audio frames to be trained and a label corresponding to the acoustic feature of the each of the audio frames to be trained, the label being configured to indicate a classification result of the audio frames to be trained, where a first N voice frame in the voice to be trained is classified as a noise frame, frames from an (N+1)-th voice frame to a last voice frame are classified as voice frames and a M noise frame after the last voice frame is classified as a voice frame.

After the framing result has been obtained, the acoustic feature of each of the audio frames is extracted. The acoustic feature may be a 64-dimensional feature of the Mel filter, and the acoustic feature may also be a Mel Frequency Cepstrum Coefficient (MFCC) feature, or a Perceptual Linear Predictive (PLP) feature and the like. The embodiment does not particularly limit the type of the acoustic feature.

After the acoustic feature of each of the audio frames has been obtained, the each of the audio frames is recognized as either a noise frame or a voice frame. As for the manner of recognizing the noise frame or the voice frame, manual recognition or a machine-forcing alignment method in the voice recognition may be employed. The present embodiment does not particularly limit the manner in which the audio frame is recognized as a noise frame or a voice frame.

After the each of the audio frames has been classified as a noise frame or a voice frame, the label corresponding to the acoustic feature of the audio frame to be trained is determined. The label is configured to indicate the classification result of the audio frame to be trained, i.e., whether the audio frame has been classified as a noise frame or a voice frame.

In the present embodiment, in order to increase the accuracy of the activity detection, a current frame is not immediately classified as a voice frame even if it is in fact so. This is because there is always some fluctuation of noise contain within. Thus, a delay is needed to guarantee enough confidence. In other words, the presence of a voice cannot be confirmed until it has been presented for certain duration. Therefore, the first N voice frames in the voice to be trained are classified as noise frames, and frames from the (N+1)-th voice frame to the last voice frame are classified as voice frames.

For the same reason, a voice may not be immediately considered to be over, i.e., be immediately labeled as noise frames, whenever a break of the voice occurs. Rather, a delay is needed to mount enough confidence to ensure that the voice is indeed over. Therefore, M noise frames after the last voice frame are classified as voice frames.

When labeled in binary, the label value corresponding to the voice frame is 1, and the label value corresponding to the noise frame is 0. Thus, for each voice, a trained data consists of an infinite number of {x, y} pairs, where x is the feature and y is the label.

S203: train, according to the acoustic feature of the audio frames to be trained and the label corresponding to the each of the audio frames to be trained, the VAD model to be trained to obtain a trained VAD model.

Having obtained the acoustic feature of the audio frames to be trained and the label corresponding to the each of the audio frames to be trained, the VAD model to be trained is trained to obtain a trained VAD model.

In the present embodiment, the VAD model is a deep neural network model which may be, for example, a Recurrent Neural Network (RNN). Specifically, for example, a longshort-term memory (LSTM) model or a Gated Recurrent Unit (GRU) model may be employed, where the GRU model is a variant of the LSTM model. For the GRU model, the network has multiple layers of RNNs stacked together, with the final output layer being 2 nodes. Softmax serves as the activation, and cross entropy serves as the cost function. Each frame has a classification result.

The present embodiment obtains the VAD model via a training using training data that fully considers the fact that the presence of a voice cannot be confirmed until it has been presented for a certain duration, and that the termination of the voice cannot be guaranteed until a delay has elapsed and enough confidence has been mounted, thereby improving the accuracy in the activity detection.

The following uses a specific implementation to illustrate how to label the each of the audio frames.

Figure 3:
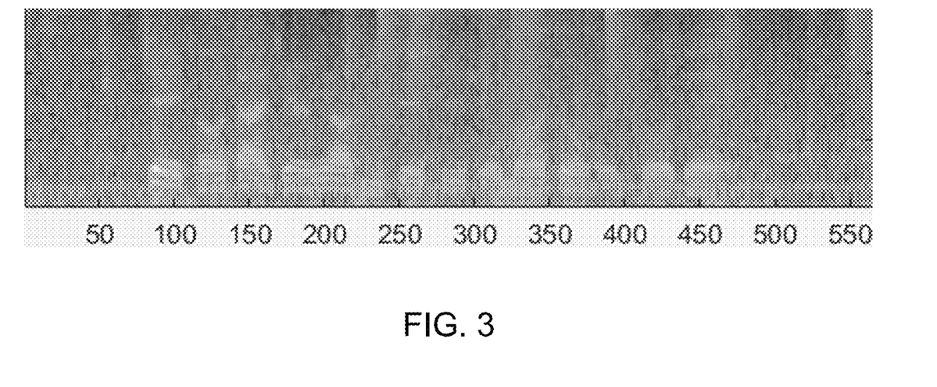
FIG. 3 is a schematic structural diagram of an acoustic feature provided by an embodiment of the present application.

FIG. 3 is a schematic structural diagram of an acoustic feature provided by an embodiment of the present application. As shown in FIG. 3, after the voice to be trained is subject to the framing processing, 550 audio frames are obtained. The horizontal axis represents the order of the audio frames, and the vertical axis represents the acoustic feature X.

For the acoustic feature X, manual annotation or machine-forcing alignment method in voice recognition is employed to obtain the annotation. The annotation is made according to the actual noise and voice conditions, and a corresponding label is referred to as a candidate label. Specifically, the annotation process is sequentially perform on the acoustic feature of the each of the audio frames to be trained to obtain candidate labels corresponding to the acoustic feature of the each of the audio frames to be trained.

Figure 4:
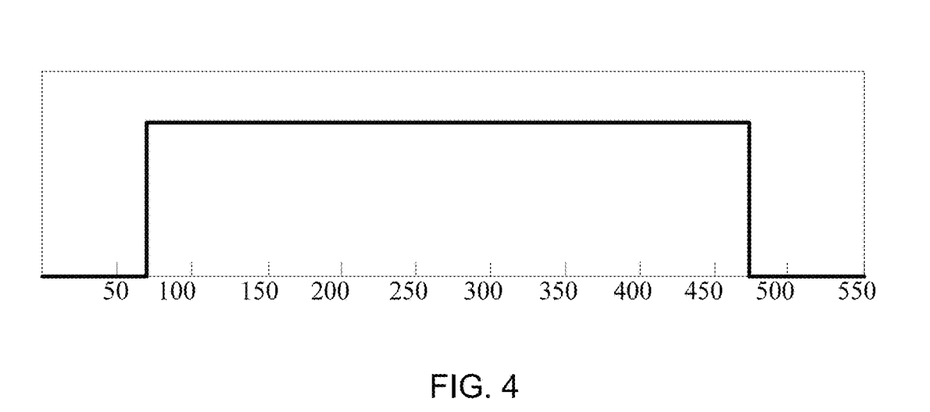
FIG. 4 is a schematic diagram of a candidate label corresponding to an acoustic feature provided by an embodiment of the present application.

FIG. 4 is a schematic diagram of a candidate label corresponding to an acoustic feature provided by an embodiment of the present application. As shown in FIG. 4, the candidate label corresponding to a voice frame is 1, and the candidate label corresponding to a noise frame is 0.

In the present embodiment, a sample data for training the model is obtained by modifying the candidate label. Specifically, the first N candidate labels for indicating voice frames are modified to obtain modified first labels, the first label being configured to indicate that the first N voice frames have been classified as noise frames. M candidate labels for indicating noise frames after the last voice frame are modified to obtain modified second labels, the second label being configured to indicate that M noise frames have been classified as voice frames. The labels corresponding to the acoustic features of the each of the audio frames to be trained is obtained according to the remaining candidate labels, the first labels and the second labels.

Figure 5:
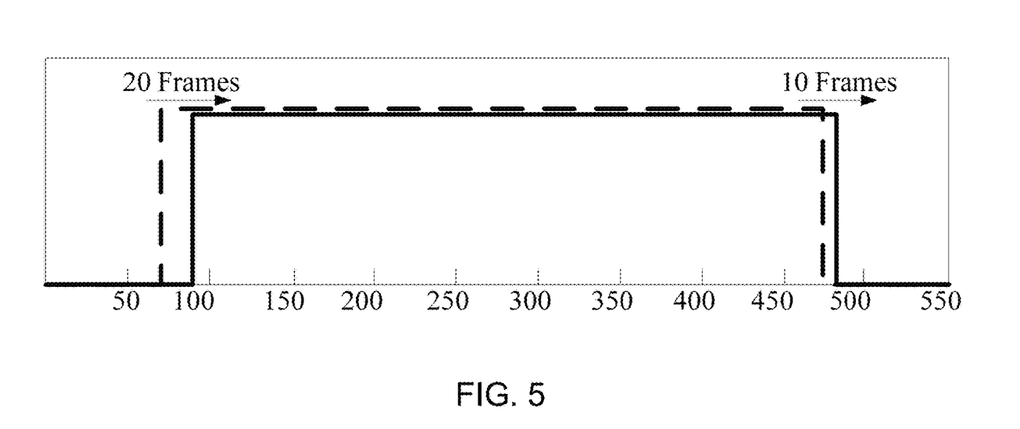
FIG. 5 is a schematic diagram of label modifying as provided by an embodiment of the present application.

In the present embodiment, the modification of the candidate labels in the embodiment of FIG. 4 is taken as an example, and the process of the label modification is described in detail in conjunction with FIG. 5.

FIG. 5 is a schematic diagram of label modifying as provided by an embodiment of the present application. As shown in FIG. 5, in the present embodiment, N may be set to be greater than M. Considering the need in the voice activity detection to balance the algorithm confidence and response speed, the delay may not extend for too long. By setting the value of M a little smaller, the algorithm confidence can be satisfied without compromising too much response speed. At the same time, the start point of the voice can be delayed slightly more because the user is talking and does not need any response from the system. The longer the delay, the higher the confidence may mount.

Optionally, in the present embodiment, N=20 and M=10 are taken as an example for detailed description. As shown in FIG. 5, the dotted line represents candidate labels. When the candidate labels are modified, the first 20 voice frames are classified as noise frames, that is, the labels are modified from 1 to 0. The 10 noise frames after the last voice frame are classified as voice frames, that is, the labels are modified from 0 to 1, and the remaining candidate labels are left unmodified.

Those skilled in the art can understand that, by the above settings, sufficient confidence can be obtained. For example, when locating the start point using the prior art VAD model, it may happen that the 1st frame to the 10th frame are classified as voice frames when the 1st frame to the 18th frame are actually noise frames. Then, when the 1st frame is identified as the start point of the voice segment and the 10th frame the end point of the voice segment, the noise segment is mistaken for a voice segment. Instead, the present embodiment sets the training data such that the occurrence of a voice segment is only considered conclusive when the first 20 frames have been classified as voice frames, that is, sufficient confidence has mounted, thus avoiding the situation in which noise is mistaken for voice segment.

For another example, when locating the end point using the prior art VAD model, upon determining that the 20th frame to the 40th frame are voice frames, the 41st frame and the 42nd frame are noise frames, and the 43rd frame to the 60th frame are voice frames, the prior art VAD model may conclude that the 20th frame to the 40th frame form a voice segment, and the 43rd to 60th frames form another voice segment, thus producing two sentences when in fact the user merely dropped his/her voice a bit or took a small breath in the 41st and 42nd frames. Instead, the present embodiment delays setting the training data, such that a voice segment is only considered over when the confidence for the noise frames has mounted to a certain extent. Thus, in the process of obtaining the training data, some noise frames are classified as voice frames to achieve sufficient confidence.

A specific embodiment is used in the following to describe a method for performing activity detection using a trained model in an embodiment of the present application.

Figure 6:
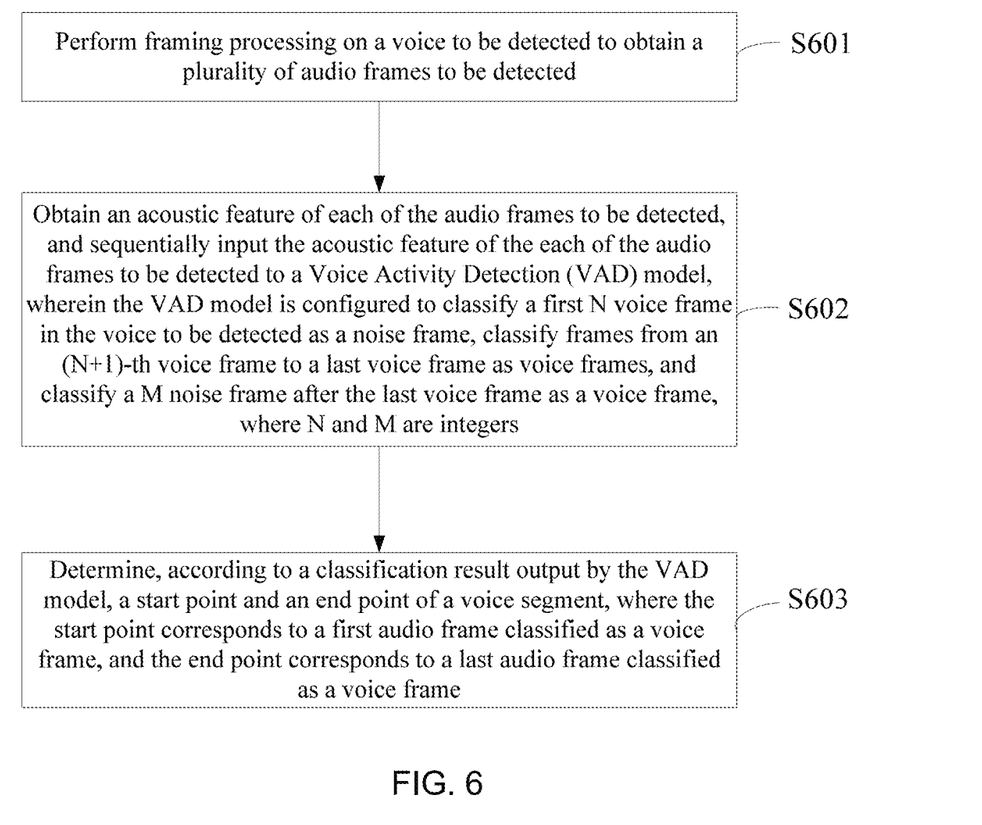
FIG. 6 is a schematic flowchart one of a voice activity detection method provided by an embodiment of the present application.

FIG. 6 is a schematic flowchart one of a voice activity detection method provided by an embodiment of the present application. As shown in FIG. 6, the method includes:

S601: perform framing processing on a voice to be detected to obtain a plurality of audio frames to be detected.

The process of performing the framing processing on the voice to be detected is similar to those of the above S201, which will not be repeated in the present embodiment.

S602: obtain an acoustic feature of each of the audio frames to be detected, and sequentially input the acoustic feature of the each of the audio frames to be detected to a Voice Activity Detection (VAD) model, where the VAD model is configured to classify a first N voice frame in the voice to be detected as a noise frame, classify frames from an (N+1)-th voice frame to a last voice frame as voice frames, and classify a M noise frame after the last voice frame as a voice frame, where N and M are integers.

After the audio frames to be detected have been obtained, the acoustic feature of each of the audio frames to be detected are extracted and then sequentially inputted into the VAD model which has been trained using the methods shown in FIGS. 4 to 6.

The VAD model outputs a classification value for each of the acoustic features. Those skilled in the art can understand that, corresponding to the above described training process of the model, the VAD model can classify the first N voice frame in the voice to be detected as a noise frame, classify the frames from the (N+1)-th voice frame to the last voice frame as voice frames, and classify M noise frame after the last voice frame as a voice frame.

S603: determine, according to a classification result output by the VAD model, a start point and an end point of a voice segment, where the start point corresponds to a first audio frame classified as a voice frame, and the end point corresponds to a last audio frame classified as a voice frame.

In the present embodiment, the start point and the end point can be directly determined according to the classification result output by the VAD model. The determined first voice frame is set to be the starting point of the voice segment, and the determined last voice frame is set to be the end point of the voice segment.

In the present embodiment, when locating the start point in a case where 1st to 30th frames are classified as noise frames and 31st to 50th frames may be noise or voice, the 31st to 50th frames will be classified as noise frames by the VAD model. When the 51st frame is a noise frame, it indicates that the 31st to 50th frames are indeed noise frames, thereby avoiding delivering the noise frames to the voice recognizer. When the 51st frame is a voice frame, it indicates that the 31st to 50th frames are actually voice frames. Thus, the 51st frame is set to be the start point of the voice segment, and the 30 frames before the 51st frame can be delivered, along with the 51st frame itself and its trailing voice frames, to the voice recognizer.

When locating the end point in a case where the 50th frame to the 230th frame are voice frames, the 231st frame to the 240th frame are small pauses or lowered voices, the VAD model of the present embodiment will not classify the 231st frame to the 240th frame as noise frames. Rather, they will be classified as a voice frames. When the 241th frame is classified as a noise frame, it indicates that the voice segment is over. Instead, when the 241th frame is classified as a voice frame, it indicates that the voice segment is not yet over, and the above method will continue to be used to determine the end point marking the end of the voice segment. The present embodiment has avoided the problem of prematurely determining the end point of a voice because the speaker is dropping voice, and has prevented a small pause by the user from breaking a full sentence into two sentences.

The voice activity detection method provided by the embodiment of the present application performs framing processing on a voice to be detected to obtain a plurality of audio frames to be detected; obtains an acoustic feature of each of the audio frames to be detected, and sequentially inputs the acoustic feature of the each of the audio frames to be detected to a VAD model; determines, according to the classification result output by the VAD model, the start point and the end point of the voice segment. By using the VAD model, the first N voice frame in the voice to be detected may be classified as a noise frame, preventing noise frames from being erroneously delivered to the voice recognizer. Moreover, by using the VAD model, the frames from the (N+1)-th voice frame to the last voice frame may be classified as voice frames, and M noise frame after the last voice frame may be classified as a voice frame, avoiding the problem where low voice is mis-recognized as an end point, and the problem where a pause by the user breaks a full sentence into two, thereby improving the accuracy in the voice activity detection.

Figure 7:
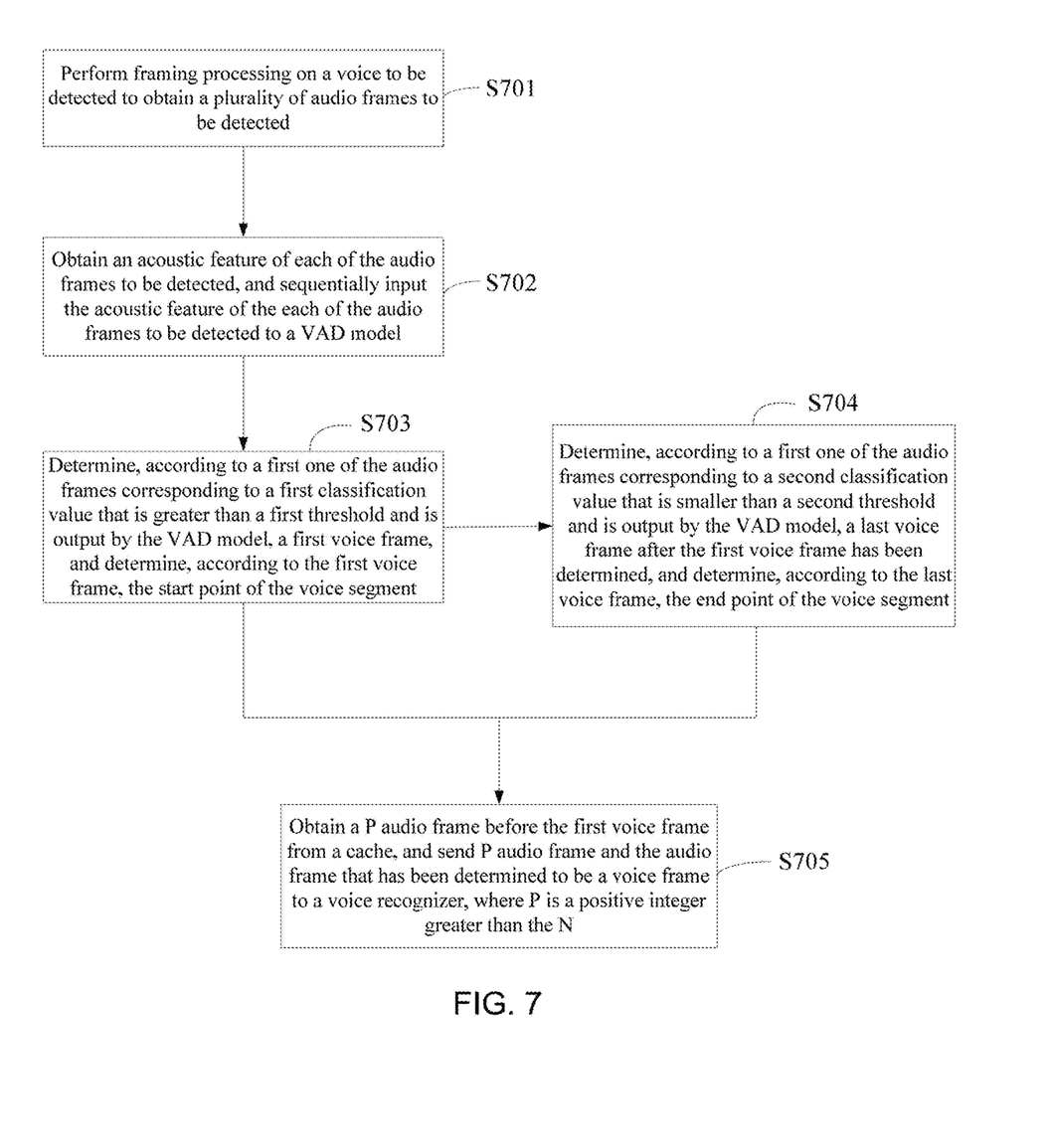
FIG. 7 is a schematic flowchart two of a voice activity detection method provided by an embodiment of the present application.

FIG. 7 is a schematic flowchart two of a voice activity detection method provided by an embodiment of the present application. As shown in FIG. 7, the method includes:

S701: perform framing processing on a voice to be detected to obtain a plurality of audio frames to be detected.

S702: obtain an acoustic feature of each of the audio frames to be detected, and sequentially input the acoustic feature of the each of the audio frames to be detected to a VAD model.

S703: determine, according to a first one of the audio frames corresponding to a first classification value that is greater than a first threshold and is output by the VAD model, a first voice frame, and determine, according to the first voice frame, the start point of the voice segment.

S704: determine, according to a first one of the audio frames corresponding to a second classification value that is smaller than a second threshold and is output by the VAD model, a last voice frame after the first voice frame has been determined, and determine, according to the last voice frame, the end point of the voice segment.

S705: obtain a P audio frame before the first voice frame from a cache, and send P audio frame and the audio frame that has been determined to be a voice frame to a voice recognizer, where P is a positive integer greater than the N.

S701 and S702 are similar to S601 and S602 in the embodiment of FIG. 6, which will not be repeated in the present embodiment.

Those skilled in the art can understand that since the VAD model is trained with finite amount of training data, the output of the VAD model may, other than 0 or 1, be a probability value between 0 and 1. The closer the probability value gets to 1, the greater the likelihood that the audio frame is a voice frame. Therefore, in S703 and S704, the first threshold and the second threshold are set in the embodiment for identifying the first voice frame and the last voice frame. The first threshold is greater than the second threshold.

Specifically, different thresholds are set for the start point and the end point. As shown in the model training, the start point has longer delays in order to mount more confidence for the VAD model. Therefore, the first threshold of the start point is set higher, such as at 0.6. Instead, the detection delay of the end point is relatively short, mounting less confidence, and thus the second threshold used may be set lower, such as at 0.4.

In S705, the first N voice frame is classified as a noise frame during the training process. Thus, when the start point of the voice has been detected, P audio frame before the first voice frame is obtained from a cache and sent to the voice recognizer, and then the audio frame thereafter that have been determined to be voice frame is also sent to the voice recognizer. Each time a voice frame is determined, the voice frame may be sent to the voice recognizer, until the end point of the voice segment is detected.

The voice activity detection method provided by the present embodiment performs framing processing on a voice to be detected to obtain a plurality of audio frames to be detected, obtains an acoustic feature of each of the audio frames to be detected, and sequentially input the acoustic feature of the each of the audio frames to be detected to a VAD model, determines a first voice frame according to a first one of the audio frames corresponding to a first classification value that is greater than a first threshold and is output by the VAD model, and determines the start point of the voice segment according to the first voice frame, determines a last voice frame according to a first one of the audio frames corresponding to a second classification value that is smaller than a second threshold and is output by the VAD model after the first voice frame has been determined, and determines the end point of the voice segment according to the last voice frame, so that the delay of the start point is longer, the delay of the end point is smaller. At the same time, P frame audio frames before the first voice frame are obtained from a cache and sent to a voice recognizer, so that the voice recognizer can acquire the complete voice segment.

Figure 8:
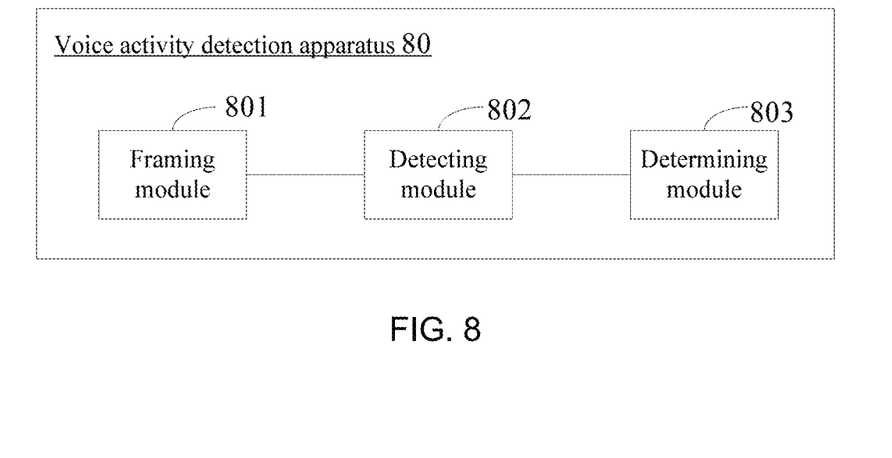
FIG. 8 is a schematic structural diagram one of a voice activity detection method provided by an embodiment of the present application.

FIG. 8 is a schematic structural diagram one of a voice activity detection method provided by an embodiment of the present application. As shown in FIG. 8, the voice activity detection apparatus 80 includes: a framing module 801, a detecting module 802 and a determining module 803.

The framing module 801 is configured to perform framing processing on a voice to be detected to obtain a plurality of audio frames to be detected.

The detecting module 802 is configured to obtain an acoustic feature of each of the audio frames to be detected, and sequentially input the acoustic feature of the each of the audio frames to be detected to a Voice Activity Detection (VAD) model, where the VAD model is configured to classify a first N voice frame in the voice to be detected as a noise frame, classify frames from an (N+1)-th voice frame to a last voice frame as voice frames, and classify a M noise frame after the last voice frame as a voice frame, where N and M are integers.

The determining module 803 is configured to determine, according to a classification result output by the VAD model, a start point and an end point of a voice segment, where the start point corresponds to a first audio frame classified as a voice frame, and the end point corresponds to a last audio frame classified as a voice frame.

In the voice activity detection apparatus provided by the embodiment of the present application, the framing module performs framing processing on a voice to be detected to obtain a plurality of audio frames to be detected; the detecting module obtains an acoustic feature of each of the audio frames to be detected, and sequentially inputs the acoustic feature of the each of the audio frames to be detected to a VAD model; and the determining module determines, according to the classification result output by the VAD model, the start point and the end point of the voice segment. By using the VAD model, the first N voice frames in the voice to be detected may be classified as a noise frame, preventing noise frames from being erroneously delivered to the voice recognizer. Moreover, by using the VAD model, the frames from the (N+1)-th voice frame to the last voice frame may be classified as voice frames, and M noise frame after the last voice frame may be classified as a voice frame, avoiding the problem where low voice is mis-recognized as an end point, and the problem where a pause by the user breaks a full sentence into two, thereby improving the accuracy in the voice activity detection.

Figure 9:
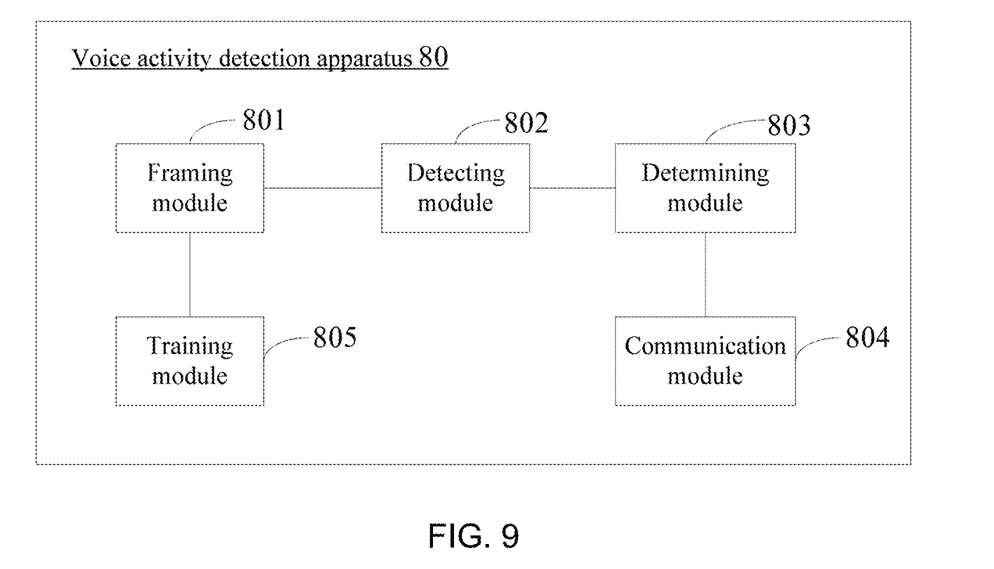
FIG. 9 is a schematic structural diagram two of a voice activity detection method provided by an embodiment of the present application.

FIG. 9 is a schematic structural diagram two of a voice activity detection method provided by an embodiment of the present application. As shown in FIG. 9, the voice activity detection apparatus 80 further includes: a communication module 804 and a training module 805.

Optionally, the determining module 803 is configured to:

determine, according to a first one of the audio frames corresponding to a first classification value that is greater than a first threshold and is output by the VAD model, a first voice frame, and determine, according to the first voice frame, the start point of the voice segment; and determine, according to a first one of the audio frames corresponding to a second classification value that is smaller than a second threshold and is output by the VAD model, a last voice frame after the first voice frame has been determined, and determine, according to the last voice frame, the end point of the voice segment, where the first threshold is greater than the second threshold.

Optionally, the communication module 804 is configured to, after the determining, according to a first one of the audio frames corresponding to a first classification value that is greater than a first threshold and is output by the VAD model, a first voice frame, obtain a P audio frame before the first voice frame from a cache, where P is a positive integer greater than the N; and send P audio frame and the audio frame that has been determined to be a voice frame to a voice recognizer.

Optionally, the training module 805 is configured to, before the sequentially inputting the acoustic feature of the each of the audio frames to be detected to the VAD model;

perform framing processing on a voice to be trained to obtain a plurality of audio frames to be trained;

obtain an acoustic feature of each of the audio frames to be trained and a label corresponding to the acoustic feature of the each of the audio frames to be trained, the label being configured to indicate a classification result of the audio frames to be trained, where a first N voice frame in the voice to be trained is classified as a noise frame, frames from an (N+1)-th voice frame to a last voice frame are classified as voice frames and a M noise frame after the last voice frame is classified as a voice frames; and train, according to the acoustic feature of the audio frames to be trained and the label corresponding to the each of the audio frames to be trained, the VAD model to be trained to obtain a trained VAD model.

Optionally, the training module 805 is configured to:

sequentially perform an annotation process on the acoustic feature of the each of the audio frames to be trained to obtain candidate labels corresponding to the acoustic feature of the each of the audio frames to be trained;

modify a first N candidate label which indicates voice frames, to obtain a first label, the first label being configured to indicate that the first N voice frame is classified as a noise frame;

modify a M candidate label which indicates a noise frame, after the last voice frame to obtain a second label, the second label being configured to indicate that M noise frame is classified as a voice frame; and obtain, according to remainder of the candidate labels, the first label and the second label, a label corresponding to the acoustic feature of the each of the audio frames to be trained.

Optionally, the VAD model is a deep neural network model.

Optionally, N is greater than or equal to M.

The activity detection apparatus provided by the embodiment of the present application may be used to perform the foregoing method embodiment with similar implementation principles and technical effects, which will not be repeated in this embodiment.

Figure 10:
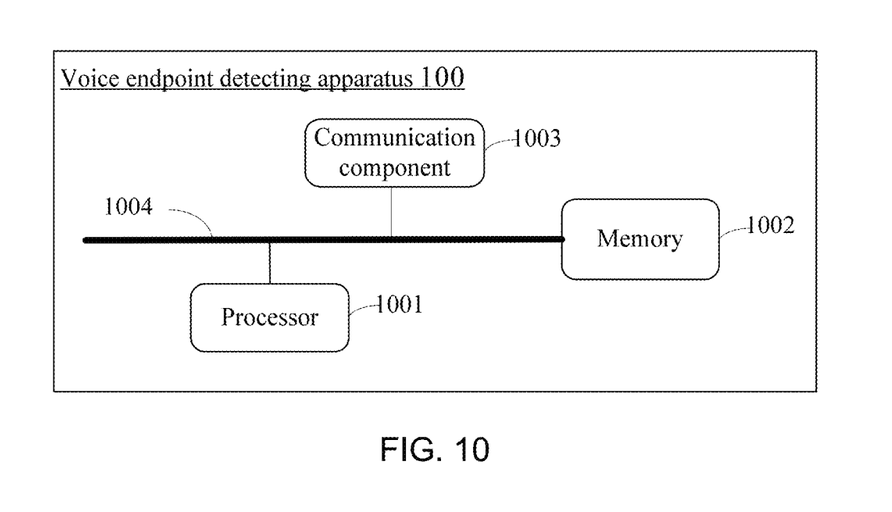
FIG. 10 is a schematic hardware architecture diagram of a voice activity detection apparatus provided by an embodiment of the present application.

FIG. 10 is a schematic hardware architecture diagram of a voice activity detection apparatus provided by an embodiment of the present application. As shown in FIG. 10, the voice endpoint detecting apparatus 100 provided in the present embodiment includes: at least one processor 1001 and a memory 1002. The voice activity detection apparatus 100 also includes a communication component 1003. The processor 1001, the memory 1002, and the communication component 1003 are interconnected via a bus 1004.

In a specific implementation process, the at least one processor 1001 executes computer execution instructions stored in the memory 1002, such that the at least one processor 1001 performs the voice activity detection method performed by the voice endpoint detecting apparatus 100 as described above.

When the back end of the embodiment is executed by a server, the communication component 1003 can transmit a voice frame to the server.

The specific implementation process of the processor 1001 may be found by referring to the foregoing method embodiments with similar implementation principles and technical effects, which will not be repeated in this embodiment.

In the embodiment shown in FIG. 10, it should be understood that the processor may be a Central Processing Unit (CPU), or other general-purpose processor, a Digital Signal Processor (DSP), an Application Specific Integrated Circuit (ASIC), or the like. The general purpose processor may be a microprocessor or any conventional processor or the like. The steps of the method disclosed in connection with the present application may be directly embodied by a hardware processor or by a combination of hardware and software modules in a processor.

The memory may include high speed RAM memory, and may also include non-volatile memory (NVM), such as at least one disk storage.

The bus may be an Industry Standard Architecture (ISA) bus, a Peripheral Component (PCI) bus, or an Extended Industry Standard Architecture (EISA) bus or the like. The bus can be divided into an address bus, a data bus, a control bus, and the like. For illustrative purpose only, the bus in the drawings of the present application is not limited to only one bus or one type of bus.

The present application also provides a computer readable storage medium having stored therein computer executed instructions that, when executed by the processor, a voice activity detection method performed by the voice activity detection device is implemented.

The computer readable storage medium described above may be implemented by any type of volatile or non-volatile memory or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk, or an optical disk. The readable storage medium can be any available medium that can be accessed by a general or special purpose computer.

An exemplary readable storage medium is coupled to the processor, such that the processor can read information from the readable storage medium and can write information to the readable storage medium. Of course, the readable storage medium can also be an integral part of the processor. The processor and the readable storage medium may be located in an Application Specific Integrated Circuit (ASIC). Of course, the processor and the readable storage medium can also reside as separate component in a standalone device.

Persons of ordinary skill in the art may understand that, all or a part of steps of the foregoing method embodiments may be implemented by a program instructing relevant hardware. The program may be stored in a computer readable storage medium. When the program runs, the steps of the foregoing embodiment methods are performed. The foregoing storage medium includes various mediums capable of storing program codes, such as a ROM (read only memory), a RAM (random access memory), a magnetic disk, or an optical disc.

Finally, it should be noted that the foregoing embodiments are merely intended for describing, rather than limiting, the technical solutions of the present application. Although the present application has been described in detail with reference to the foregoing embodiments, persons of ordinary skill in the art should understand that it remains possible to make modifications to the technical solutions described in the foregoing embodiments, or make equivalent substitutions to some or all technical features therein. However, these modifications or substitutions do not make the essence of corresponding technical solution depart from the scope of the technical solutions in various embodiments of the present application.

What is claimed is:

1. A voice activity detection method, comprising:
   performing framing processing on a voice to be detected to obtain a plurality of audio frames to be detected;
   obtaining an acoustic feature of each of the audio frames to be detected, and sequentially inputting the acoustic feature of the each of the audio frames to be detected to a Voice Activity Detection (VAD) model, wherein the VAD model is configured to:

classify audio frames to be detected before first (N+1) continuous voice frames in the voice to be detected as noise frames;

classify first N continuous voice frames of the first (N+1) continuous voice frames as noise frames; and classify audio frames to be detected from an (N+1)-th voice frame of the first (N+1) continuous voice frames to an M-th noise frame of first M continuous noise frames which are after the first (N+1) continuous voice frames as voice frames, wherein N and M are integers;

determining, according to a classification result output by the VAD model, a start point and an end point of a voice segment, wherein the start point corresponds to a first audio frame classified as a voice frame, and the end point corresponds to a last audio frame classified as a voice frame, obtaining P consecutive audio frames before the start point from a cache, wherein P audio frames are the audio frames received and stored in the cache, and P is a positive integer greater than N; and sending the concatenated P audio frames and the audio frames that have been determined to be voice frames to a voice recognizer.

2. The method according to claim 1, wherein the determining, according to a classification result output by the VAD model, a start point and an end point of a voice segment comprises:

determining, according to a first one of the audio frames corresponding to a first classification value that is greater than a first threshold and is output by the VAD model, a first voice frame, and determining, according to the first voice frame, the start point of the voice segment; and determining, according to a first one of the audio frames corresponding to a second classification value that is smaller than a second threshold and is output by the VAD model, a last voice frame after the first voice frame has been determined, and determining, according to the last voice frame, the end point of the voice segment, wherein the first threshold is greater than the second threshold.

3. The method according to claim 1, wherein before the sequentially inputting the acoustic feature of the each of the audio frames to be detected to a VAD model, the method further comprises:

performing framing processing on a voice to be trained to obtain a plurality of audio frames to be trained;

obtaining an acoustic feature of each of the audio frames to be trained and a label corresponding to the acoustic feature of the each of the audio frames to be trained, the label being configured to indicate a classification result of the audio frames to be trained, wherein audio frames to be trained before first (N+1) continuous voice frames in the voice to be trained are classified as noise frames, first N continuous voice frames of the first (N+1) continuous voice frames are classified as noise frames, and audio frames to be trained from an (N+1)-th voice frame of the first (N+1) continuous voice frames to an M-th noise frame of first M continuous noise frames which are after the first (N+1) continuous voice frames are classified as voice frames; and training, according to the acoustic feature of the audio frames to be trained and the label corresponding to the acoustic feature of the each of the audio frames to be trained, the VAD model to be trained to obtain a trained VAD model.

4. The method according to claim 3, wherein the obtaining the label corresponding to the acoustic feature of the each of the audio frames to be trained comprises:

sequentially performing an annotation process on the acoustic feature of the each of the audio frames to be trained to obtain candidate labels corresponding to the acoustic feature of the each of the audio frames to be trained;

modifying each of candidate labels which indicate voice frames before an (N+1)-th candidate label of first (N+1) continuous candidate labels which indicate voice frames, to obtain a first label, the first label being configured to indicate that each of voice frames before an (N+1)-th voice frame of first (N+1) continuous voice frames is classified as a noise frame;

modifying each of candidate labels which indicate noise frames after the (N+1)-th candidate label of first (N+1) continuous candidate labels which indicate voice frames and before an M-th candidate label of first M continuous candidate labels which indicate noise frames and which are after the first (N+1) continuous candidate labels, to obtain a second label, the second label being configured to indicate that each of noise frames after the (N+1)-th voice frame of the first (N+1) continuous voice frames and before an M-th noise frame of M continuous noise frames which are after the first (N+1) continuous voice frames is classified as a voice frame; and obtaining, according to remainder of the candidate labels, the first label and the second label, a label corresponding to the acoustic feature of the each of the audio frames to be trained.

5. The method according to claim 1, wherein the VAD model is a deep neural network model.

6. The method according to claim 1, wherein N is greater than or equal to the M.

7. A voice activity detection apparatus, comprising a processor, a receiver and a memory storing instructions thereon, the processor when executing the instructions, being configured to:

perform framing processing on a voice to be detected to obtain a plurality of audio frames to be detected;

obtain an acoustic feature of each of the audio frames to be detected, and sequentially input the acoustic feature of the each of the audio frames to be detected to a Voice Activity Detection (VAD) model, wherein the VAD model is configured to:

classify audio frames to be detected before first (N+1) continuous voice frames in the voice to be detected as noise frames;

classify first N continuous voice frames of the first (N+1) continuous voice frames as noise frames; and classify audio frames to be detected from an (N+1)-th voice frame of the first (N+1) continuous voice frames to an M-th noise frame of first M continuous noise frames which are after the first (N+1) continuous voice frames as voice frames, wherein N and M are integers;

determine, according to a classification result output by the VAD model, a start point and an end point of a voice segment, wherein the start point corresponds to a first audio frame classified as a voice frame, and the end point corresponds to a last audio frame classified as a voice frame, obtaining P consecutive audio frames before the start point from a cache, wherein P audio frames are the audio frames received and stored in the cache, and P is a positive integer greater than N; and sending the concatenated P audio frames and the audio frames that have been determined to be voice frames to a voice recognizer.

8. The apparatus according to claim 7, wherein the processor is further configured to:
determine, according to a first one of the audio frames corresponding to a first classification value that is greater than a first threshold and is output by the VAD model, a first voice frame, and determine, according to the first voice frame, the start point of the voice segment; and
determine, according to a first one of the audio frames corresponding to a second classification value that is smaller than a second threshold and is output by the VAD model, a last voice frame after the first voice frame has been determined, and determine, according to the last voice frame, the end point of the audio frames to be detected the voice segment, wherein the first threshold is greater than the second threshold.

9. The apparatus according to claim 7, wherein the processor is further configured to:
before the sequentially inputting the acoustic feature of the each of the audio frames to be detected to a VAD model,
perform framing processing on a voice to be trained to obtain a plurality of audio frames to be trained;
obtain an acoustic feature of each of the audio frames to be trained and a label corresponding to the acoustic feature of the each of the audio frames to be trained, the label being configured to indicate a classification result of the audio frames to be trained, wherein audio frames to be trained before first (N+1) continuous voice frames in the voice to be trained are classified as noise frames, first N continuous voice frames of the first (N+1) continuous voice frames are classified as noise frames, and audio frames to be trained from an (N+1)-th voice frame of the first (N+1) continuous voice frames to an M-th noise frame of first M continuous noise frames which are after the first (N+1) continuous voice frames are classified as voice frames; and
train, according to the acoustic feature of the audio frames to be trained and the label corresponding to the acoustic feature of the each of the audio frames to be trained, the VAD model to be trained to obtain a trained VAD model.

10. The apparatus according to claim 9, wherein the processor is configured to:
sequentially perform an annotation process on the acoustic feature of the each of the audio frames to be trained to obtain candidate labels corresponding to the acoustic feature of the each of the audio frames to be trained;
modify each of candidate labels which indicate voice frames before an (N+1)-th candidate label of first (N+1) continuous candidate labels which indicate voice frames, to obtain a first label, the first label being configured to indicate that each of voice frames before an (N+1)-th voice frame of first (N+1) continuous voice frames is classified as a noise frame;
modify each of candidate labels which indicate noise frames after the (N+1)-th candidate label of first (N+1) continuous candidate labels which indicate voice frames and before an M-th candidate label of first M continuous candidate labels which indicate noise frames and which are after the first (N+1) continuous candidate labels, to obtain a second label, the second label being configured to indicate that each of noise frames after the (N+1)-th voice frame of the first (N+1) continuous voice frames and before an M-th noise frame of M continuous noise frames which are after the first (N+1) continuous voice frames is classified as a voice frame; and
obtain, according to remainder of the candidate labels, the first label and the second label, a label corresponding to the acoustic feature of the each of the audio frames to be trained.

11. The apparatus according to claim 7, wherein the VAD model is a deep neural network model.

12. The apparatus according to claim 7, wherein N is greater than or equal to the M.

13. A non-transitory computer readable storage medium, storing a computer execution instruction which, when executed by a processor to implement the following:
perform framing processing on a voice to be detected to obtain a plurality of audio frames to be detected;
obtain an acoustic feature of each of the audio frames to be detected, and sequentially input the acoustic feature of the each of the audio frames to be detected to a Voice Activity Detection (VAD) model, wherein the VAD model is configured to:
classify audio frames to be detected before first (N+1) continuous voice frames in the voice to be detected as noise frames;
classify first N continuous voice frames of the first (N+1) continuous voice frames as noise frames; and,
classify audio frames to be detected from an (N+1)-th voice frame of the first (N+1) continuous voice frames to an M-th noise frame of first M continuous noise frames which are after the first (N+1) continuous voice frames as voice frames, wherein N and M are integers;
determine, according to a classification result output by the VAD model, a start point and an end point of a voice segment, wherein the start point corresponds to a first audio frame classified as a voice frame, and the end point corresponds to a last audio frame classified as a voice frame,
obtain P consecutive audio frames before the start point from a cache, wherein P audio frames are the audio frames received and stored in the cache, and P is a positive integer greater than N; and
send the concatenated P audio frames and the audio frames that have been determined to be voice frames to a voice recognizer.

14. The non-transitory computer readable storage medium according to claim 13, wherein the storage medium further comprises a computer execution instruction which, when executed by the processor to implement the following:
determine, according to a first one of the audio frames corresponding to a first classification value that is greater than a first threshold and is output by the VAD model, a first voice frame, and determine, according to the first voice frame, the start point of the voice segment; and
determine, according to a first one of the audio frames corresponding to a second classification value that is smaller than a second threshold and is output by the VAD model, a last voice frame after the first voice frame has been determined, and determine, according to the last voice frame, the end point of the audio frames to be detected, wherein the first threshold is greater than the second threshold.

15. The non-transitory computer readable storage medium according to claim 13, wherein the storage medium further comprises a computer execution instruction which, when executed by the processor to implement the following:

before the sequentially inputting the acoustic feature of the each of the audio frames to be detected to a VAD model, perform framing processing on a voice to be trained to obtain a plurality of audio frames to be trained;

obtain an acoustic feature of each of the audio frames to be trained and a label corresponding to the acoustic feature of the each of the audio frames to be trained, the label being configured to indicate a classification result of the audio frames to be trained, wherein audio frames to be trained before first (N+1) continuous voice frames in the voice to be trained are classified as noise frames, first N continuous voice frames of the first (N+1) continuous voice frames are classified as noise frames, and audio frames to be trained from an (N+1)-th voice frame of the first (N+1) continuous voice frames to an M-th noise frame of first M continuous noise frames which are after the first (N+1) continuous voice frames are classified as voice frames; and train, according to the acoustic feature of the audio frames to be trained and the label corresponding to the acoustic feature of the each of the audio frames to be trained, the VAD model to be trained to obtain a trained VAD model.

16. The non-transitory computer readable storage medium according to claim 15, wherein the storage medium further comprises a computer execution instruction which, when executed by the processor to implement the following:

sequentially perform an annotation process on the acoustic feature of the each of the audio frames to be trained to obtain candidate labels corresponding to the acoustic feature of the each of the audio frames to be trained;

modify each of candidate labels which indicate voice frames before an (N+1)-th candidate label of first (N+1) continuous candidate labels which indicate voice frames, to obtain a first label, the first label being configured to indicate that each of voice frames before an (N+1)-th voice frame of first (N+1) continuous voice frames is classified as a noise frame;

modify each of candidate labels indicate noise frames after the (N+1)-th candidate label of first (N+1) continuous candidate labels which indicate voice frames and before an M-th candidate label of first M continuous candidate labels which indicate noise frames and which are after the first (N+1) continuous candidate labels, to obtain a second label, the second label being configured to indicate that each of noise frames after the (N+1)-th voice frame of the first (N+1) continuous voice frames and before an M-th noise frame of M continuous noise frames which are after the first (N+1) continuous voice frames is classified as a voice frame; and obtain, according to remainder of the candidate labels, the first label and the second label, a label corresponding to the acoustic feature of the each of the audio frames to be trained.

17. The non-transitory computer readable storage medium according to claim 13, wherein the VAD model is a deep neural network model.

* * * * *